J. F. RANDA.
TOOL HOLDER.
APPLICATION FILED DEC. 31, 1919.
1,359,103.
Patented Nov. 16, 1920.
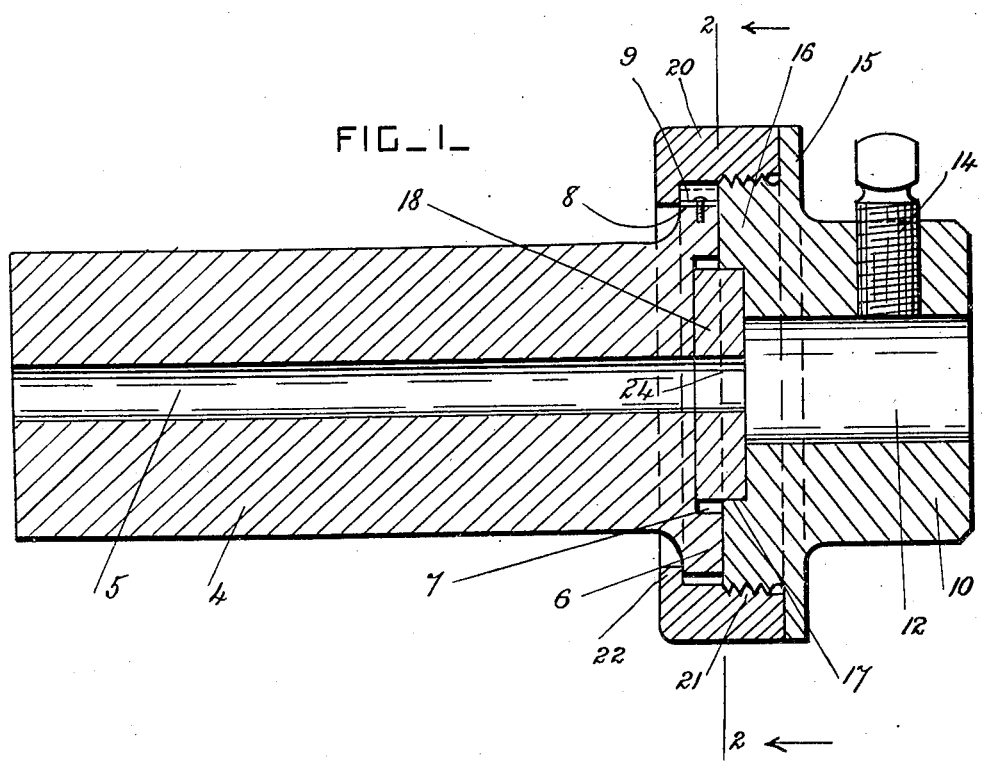
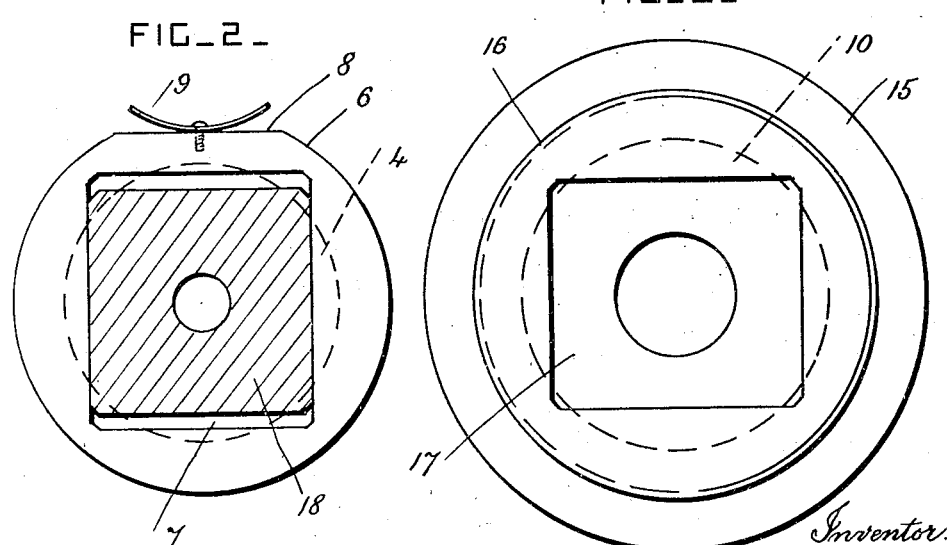
Inventor.
James F. Randa
by Herbert W. Jenner.
Attorney.

UNITED STATES PATENT OFFICE.

JAMES F. RANDA, OF MUNCIE, INDIANA.

TOOL-HOLDER.

1,359,103.   Specification of Letters Patent.   Patented Nov. 16, 1920.

Application filed December 31, 1919. Serial No. 348,533.

*To all whom it may concern:*

Be it known that I, JAMES F. RANDA, a citizen of the United States, residing at Muncie, in the county of Delaware and State of Indiana, have invented certain new and useful Improvements in Tool-Holders, of which the following is a specification.

This invention relates to devices for holding reamers and other similar tools used on automatic and other screw machines so that they will form straight and true holes; and it consists in the novel construction and combination of the parts hereinafter fully described and claimed.

In the drawings, Figure 1 is a longitudinal section of a tool holder constructed according to this invention. Fig. 2 is a cross-section taken on the line 2—2 in Fig. 1, and showing the shank which is clamped in the turret. Fig. 3 is an end view of the socket that holds the reamer or other tool.

A shank 4 is provided, and is adapted to be clamped in the turret of a screw machine. This shank has a central hole 5 so that oil can be fed through it to the reamer. A circular flange 6 is formed on one end of the shank, and the said end has an oblong recess 7. The upper side portion of the flange 6 is cut away to form a flat surface 8, and a spring 9 is secured to this surface.

A socket 10 is provided, and has a central hole 12 in which the reamer or other tool is secured by a set-screw 14 or other approved means, and this socket has a circumferential flange 15 and a screwthreaded end portion 16. The screwthreaded end portion is provided with an oblong recess 17 similar to the recess 7, and the two recesses are so arranged that the longer portion of each overlaps the shorter portion of the other.

A square floating coupling plate 18 is provided, and fits in the shorter portions of the recesses so that the socket 10 cannot revolve but may slide to a limited extent in every direction in a vertical plane.

The socket 10 is connected to the shank by a union nut 20 having a screwthreaded portion 21 which is screwed onto the screwthreaded portion 16, and which bears against the flange 15. The union nut has an inwardly projecting flange 22 which overlaps the circular flange 6 on the shank. The coupling plate 18 has a central hole 24, for the passage of oil, which registers with the hole in the shank. The coupling nut rests on the spring 9, which is adjusted so that the nut, socket and reamer are supported by the spring with the axis of the reamer normally in line with the axis of the shank. The sides of the coupling plate are arranged to bear against the bottoms of the recesses, and to slide freely against them. The slidable parts all slide freely against the non-slidable flange of the shank without being pressed against it by longitudinal pressure.

The reamer is floated so that it is free to move to a limited extent in every direction in a plane crosswise of the axis of the shank, and the reamer will form straight and true holes irrespective of the exact alinement of the driving spindle and the work with the axis of the turret and the tool shank. When the reamer has been accidentally and temporarily pressed downward, it is raised and restored to its normal position automatically by the action of the spring 9.

What I claim is:

1. In a tool holder, a shank provided with a rectangular recess in one end, a tool socket provided with a rectangular recess in one end, each said recess being arranged to overlap the other, a coupling plate engaging with the said recesses, a union nut coupling the tool socket to the shank and permitting the tool socket to slide crosswise of the shank in every direction, and a spring for supporting the weight of the slidable parts from the non-slidable shank, said spring operating to raise the slidable parts to their normal position when they have been temporarily depressed.

2. In a tool holder, a shank provided at one end with a flange and a rectangular recess, a tool socket provided with a rectangular recess in one end, each said recess being arranged to overlap the other, a coupling plate engaging with the said recesses, a union nut screwed on the tool socket and having a flange which overlaps the flange on the shank and permits the tool socket to slide crosswise of the shank in every direction, and a spring secured to the upper side of the flange on the shank and supporting the weight of the slidable parts from the non-slidable flange of the shank, said spring operating to raise the tool socket to its normal position with its axis in line with the axis of the non-slidable shank when it has been temporarily depressed.

In testimony whereof I have affixed my signature.

JAMES F. RANDA.